United States Patent Office 3,026,212
Patented Mar. 20, 1962

3,026,212
REFRACTORY PRODUCT AND METHOD OF MANUFACTURE
Wayne X. Fay, Villanova, and Leland B. McClure, Haverford, Pa., assignors to General Refractories Company, Philadelphia, Pa., a corporation of Pennsylvania
No Drawing. Filed Sept. 25, 1959, Ser. No. 842,214
6 Claims. (Cl. 106—68)

The present invention relates to an improved semisilica refractory brick for use in furnaces such as heat treating furnaces and blast furnace stoves where deformation under hot load, thermal shock, resistance and strength are required.

The American Society for Testing Materials has adopted a standard classification for the properties of a Semisilica Brick, under a Fireclay Refractory Brick. According to the ASTM the semisilica brick must not deform more than 1.5% at 2460° F., must have a modulus of rupture of 300 pounds per square inch and must have a minimum silica content of 72%.

Semisilica fireclay refractory brick are usually manufactured from either highly siliceous clay which is sometimes called "Jersey Clay," or by calcining a mixture of fireclay and ganister or quartz, thereby forming grog, and then using such grog as the major ingredient of the refractory brick and mixing it with siliceous fireclay before forming the refractory brick.

Kraner in U.S. Patent 2,384,180, granted September 4, 1945, for Semisilica Brick, describes a refractory brick containing from 80 to 90% of silica, made by mixing quartzite or ganister with low alkali clay to produce a mix containing 10% between 0 and 4 mesh, 16.2% between 6 and 10 mesh, 20.7% between 10 and 28 mesh, 17.1% between 28 and 65 mesh, and 36.0% smaller than 65 mesh. Using the composition of Kraner it has not been possible to obtain a high enough modulus of rupture to meet the American Society for Testing Materials' specification of 300 p.s.i. as set forth above.

A purpose of the present invention is to obtain higher physical properties for a semisilica refractory brick.

A further purpose is to make a structurally strong semisilica refractory brick with lower percentages of previously calcined material, utilizing raw siliceous rock in the form of washed quartz pebbles or washed ganister, which is raw in the sense that it is not previously calcined, and thereby reducing the cost of production since only small quantities of previously calcined materials will be required.

A further purpose is to reduce the particle size of the quartz pebbles or siliceous rock and thereby improve the transverse strength of a semisilica refractory brick as measured by the modulus of rupture.

As a result of an extensive study of the properties of combinations of kaolin, fireclay and washed quartz, it has been found that greatly improved modulus of rupture can be obtained by using the following combination of ingredients and particle sizes in a semisilica refractory brick:

| | Percent |
|---|---|
| Washed quartz passing 28 mesh | 50 to 70 |
| Calcined kaolin passing 10 mesh | 10 to 30 |
| Raw kaolin passing 20 mesh | 10 to 30 |
| Raw plastic fireclay passing 20 mesh | 2 to 10 |

Wherever screen sizes are mentioned herein, it is intended to indicate Tyler standard mesh per linear inch.

All percentages stated herein are by weight, except percentage deformation under load.

The chemical analysis of the washed quartz or ganister is at least 97% silica, $SiO_2$, the balance impurities such as alumina, iron oxide, titania and alkalies.

The kaolin from which the calcined kaolin and the raw kaolin will both come will preferably be Georgia kaolin having a typical analysis and typical minimum and maximum limits as follows:

| | Typical, percent | Min., percent | Max., percent |
|---|---|---|---|
| Loss on Ignition | 13.77 | 12.0 | 15.0 |
| Silica, $SiO_2$ | 44.60 | 40.0 | 48.0 |
| Ferric Oxide, $Fe_2O_3$ | 0.98 | 0.5 | 1.5 |
| Alumina, $Al_2O_3$ | 37.17 | 35.0 | 40.0 |
| Titania, $TiO_2$ | 2.35 | 2.0 | 3.0 |
| Lime, CaO | 0.12 | .05 | 0.4 |
| Magnesia, MgO | 0.25 | .10 | 0.6 |
| Alkalies, $Na_2O$ and $K_2O$ | 0.25 | .10 | 1.0 |

The calcined kaolin will suitably be calcined at a temperature of at least 2650 degrees F. and preferably about 2750 degrees F. for at least 1 hour.

The plastic fireclay will suitably be a plastic refractory clay of the character known as Missouri, Pennsylvania, Kentucky, Colorado or Alabama plastic fireclay, which has a typical analysis and minimum and maximum typical analyses as follows:

| | Typical, percent | Min., percent | Max., percent |
|---|---|---|---|
| Loss on Ignition | 8.09 | 7.5 | 12.5 |
| Silica, $SiO_2$ | 56.84 | 52.0 | 60.0 |
| Ferric Oxide, $Fe_2O_3$ | 1.82 | 1.0 | 2.5 |
| Alumina, $Al_2O_3$ | 27.40 | 25.0 | 33.0 |
| Titania, $TiO_2$ | 1.28 | 1.0 | 2.0 |
| Lime, CaO | 0.30 | 0.1 | 0.5 |
| Magnesia, MgO | 0.91 | 0.5 | 1.5 |
| Alkalies, $Na_2O$ and $K_2O$ | 2.99 | 1.5 | 3.5 |

If desired, between 0.25 and 1% of bentonite may be used which has a typical analysis as follows:

| | Typical, percent |
|---|---|
| Loss on ignition | 4.87 |
| Silica, $SiO_2$ | 60.89 |
| Alumina, $Al_2O_3$ | 22.17 |
| Iron oxide, $Fe_2O_3$ | 3.69 |
| Titania, $TiO_2$ | 0.18 |
| Lime, CaO | 1.28 |
| Magnesia, MgO | 2.77 |
| Alkalies, $Na_2O$ and $K_2O$ | 2.89 |

*Example I*

The preferred composition for the brick is as follows:

| | Percent |
|---|---|
| Washed quartz passing 28 mesh | 55 |
| Calcined kaolin passing 10 mesh | 20 |
| Raw kaolin passing 20 mesh | 20 |
| Plastic fireclay passing 20 mesh | 5 |

The kaolin was Georgia kaolin, and the plastic fireclay in this example was Missouri plastic clay.

The washed screen analysis of the ingredients is as follows:

| Smaller Than— | Larger Than— | Calcined Kaolin, percent | Raw Kaolin and Plastic fireclay, percent | Ground Washed Quartz, percent |
|---|---|---|---|---|
| 8 mesh | 10 mesh | 2.4 | | |
| 10 mesh | 14 mesh | 10.8 | | |
| 14 mesh | 20 mesh | 12.8 | | |
| 20 mesh | 28 mesh | 16.8 | 0.4 | 7.6 |
| 28 mesh | 35 mesh | 14.4 | 2.4 | 20.0 |
| 35 mesh | 48 mesh | 11.2 | 2.0 | 12.8 |
| 48 mesh | 65 mesh | 9.2 | 2.0 | 9.6 |
| 65 mesh | 100 mesh | 6.0 | 1.2 | 11.2 |
| 100 mesh | 150 mesh | 2.8 | 1.2 | 8.8 |
| smaller than 150 mesh | | 7.6 | 90.8 | 30.0 |

Consolidating the table set forth above, the washed screen analysis of the composite of all the ingredients is as follows:

| Smaller Than— | Larger Than— | Percent |
|---|---|---|
| 8 mesh | 10 mesh | Trace |
| 10 mesh | 14 mesh | 1.0 |
| 14 mesh | 20 mesh | 1.0 |
| 20 mesh | 28 mesh | 4.0 |
| 28 mesh | 35 mesh | 10.0 |
| 35 mesh | 48 mesh | 10.0 |
| 48 mesh | 65 mesh | 9.0 |
| 65 mesh | 100 mesh | 8.0 |
| 100 mesh | 150 mesh | 6.0 |
| smaller than 150 mesh | | 50.0 |

It has been discovered that it is very desirable to employ in the mix at least 45% of particles which pass through 150 mesh in order to obtain the improved mechical properties of the present invention.

Each of the ingredients was ground and screened separately. The correct amount of each ingredient was weighed out and the mixture was mixed with about 6% of water in a muller type mixer or pugmill. The mix was tempered in a conventional dry or wet pan as well known in the art to obtain the desired consistency for molding.

The tempered mix was molded into brick by a power press to a minimum wet molded density of 1.30 ounces per cubic inch. The pressed brick was burned in a tunnel kiln at cone 13. A periodic kiln may be used if desired. The burning temperature may be any temperature between cone 10 and cone 15 both inclusive.

The modulus of rupture of the semisilica brick manufactured according to this example ranged between 458 and 582 pounds per square inch and averaged 528 pounds per square inch. The deformation under load at 2460° F. was 0.0%.

*Example II*

The procedure of Example I was followed, using Pennsylvania plastic fireclay instead of Missouri plastic fireclay. Firing took place in a periodic kiln. The modulus of rupture ranged between 368 and 564, with an average of 467 pounds per square inch.

*Example III*

The procedure of Example I was carried out, using a mix in which only 40% of the particles passed 150 mesh on a washed screen analysis. The density was not as great, and the modulus of rupture averaged only about 250 pounds per square inch. Further experiments indicated that an important improvement in modulus of rupture occurred where the particles through 150 mesh on a washed screen analysis were in excess of 45% by weight.

*Example IV*

The following mixture is employed:

| | Percent |
|---|---|
| Washed quartz passing 28 mesh | 50 |
| Calcined kaolin passing 10 mesh | 10 |
| Raw kaolin passing 20 mesh | 30 |
| Raw plastic fireclay passing 20 mesh | 10 |

The properties differ from Example I in that the silica, $SiO_2$, content may become lower than permitted by the American Society for Testing Materials but still be desirable for some purposes.

*Example V*

A mixture of the following composition is employed, otherwise following Example I:

| | Percent |
|---|---|
| Washed quartz passing 28 mesh | 70 |
| Calcined kaolin passing 10 mesh | 10 |
| Raw kaolin passing 20 mesh | 18 |
| Raw plastic fireclay passing 20 mesh | 2 |

The properties differ from that of Example I in that the silica, $SiO_2$, content becomes higher than Example I and this is the upper limit of the range in silica content.

In view of our invention and disclosure, variations and modifications to meet individual whim or particular need will doubtless become evident to others skilled in the art, to obtain all or part of the benefits of our invention without copying the process and structure shown, and we, therefore, claim all such insofar as they fall within the reasonable spirit and scope of our claims.

Having thus described our invention what we claim as new and desire to secure by Letters Patent is:

1. The method of making a semisilica refractory brick which comprises mixing together from 50 to 70% by weight of washed quartz particles passing 28 mesh, between 10 and 30% by weight of calcined kaolin particles passing 10 mesh, between 10 and 30% by weight of raw kaolin particles passing 20 mesh and between 2 and 10% by weight of raw plastic fireclay particles passing 20 mesh, molding the mixture into brick and firing the brick at a temperature between cone 10 and cone 15 inclusive.

2. The method of claim 1, in which at least 45% by weight of the particles passes 150 mesh on a washed screen analysis.

3. The method of claim 1, which comprises incorporating in the mix between 0.25 and 1% by weight of bentonite.

4. A semisilica refractory brick consisting essentially of 50 to 70% by weight of washed quartz passing 28 mash, 10 to 30% by weight of calcined kaolin passing 10 mesh, and 2 to 10% by weight of raw plastic fireclay passing 20 mesh.

5. A semisilica refractory brick of claim 4, in which at least 45% by weight of the particles pass 150 mesh on a washed screen analysis.

6. A semisilica refractory brick of claim 5, which also includes from 0.25 to 1% by weight of bentonite.

References Cited in the file of this patent

UNITED STATES PATENTS

| 2,384,180 | Kraner | Sept. 4, 1945 |
| 2,880,098 | Jones | Mar. 31, 1959 |